(12) United States Patent
Lee

(10) Patent No.: US 12,176,749 B2
(45) Date of Patent: Dec. 24, 2024

(54) POWER SUPPLY METHOD FOR DUAL POWER LOAD AND APPARATUS THEREOF

(71) Applicants: Hyundai Motor Company, Seoul (KR); Kia Corporation, Seoul (KR)

(72) Inventor: Ho Joong Lee, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 78 days.

(21) Appl. No.: 18/099,158

(22) Filed: Jan. 19, 2023

(65) Prior Publication Data

US 2024/0072567 A1    Feb. 29, 2024

(30) Foreign Application Priority Data

Aug. 23, 2022    (KR) .......................... 10-2022-0105692

(51) Int. Cl.
*H02J 7/34*     (2006.01)
*H02J 7/00*     (2006.01)

(52) U.S. Cl.
CPC ............ *H02J 7/342* (2020.01); *H02J 7/0013* (2013.01)

(58) Field of Classification Search
None
See application file for complete search history.

(56) References Cited

U.S. PATENT DOCUMENTS

| 2019/0391557 A1* | 12/2019 | Volkovich ........ G05B 19/41875 |
| 2022/0065946 A1* | 3/2022 | Kwon ..................... B60L 58/20 |
| 2022/0091193 A1* | 3/2022 | Kwon ..................... G01R 31/54 |

FOREIGN PATENT DOCUMENTS

| KR | 10-0534697 | 12/2005 |
| KR | 10-1500146 | 3/2015 |
| KR | 10-2024-0027932 | 3/2024 |

* cited by examiner

*Primary Examiner* — Jared Fureman
*Assistant Examiner* — Aqeel H Bukhari
(74) *Attorney, Agent, or Firm* — Morgan, Lewis & Bockius LLP

(57) ABSTRACT

A power supply method and apparatus for dual power load includes a low voltage direct current-direct current converter (LDC) configured to convert a voltage of a high-voltage battery to supply power, a first low-voltage battery configured to be charged by receiving the power from the LDC and to supply power to a general load or a dual power load, a second low-voltage battery configured to be charged by receiving the power from the LDC and to supply power to the dual power load, a first relay disposed between the LDC and the first low-voltage battery, a second relay disposed between the LDC and the second low-voltage battery, a first battery sensor configured to measure a voltage of the first low-voltage battery, and a second battery sensor configured to measure a voltage of the second low-voltage battery.

20 Claims, 7 Drawing Sheets

POWER SUPPLY METHOD FOR DUAL POWER LOAD AND APPARATUS THEREOF

CROSS-REFERENCE TO RELATED APPLICATION(S)

The present application claims priority to Korean Patent Application No. 10-2022-0105692, filed on Aug. 23, 2022, the entire contents of which is incorporated herein for all purposes by this reference.

BACKGROUND OF THE PRESENT DISCLOSURE

Field of the Present Disclosure

The present disclosure relates to a power supply method and apparatus for a dual power load, and more particularly, to a method and apparatus of charging and discharging a main battery and an auxiliary battery in a dual power structure and supplying power to a dual power load.

Description of Related Art

Recently, with increasing interest in the environment, the number of eco-friendly vehicles having an electric motor as a power source are increasing. The eco-friendly vehicle is also referred to as a motorized vehicle, and a representative example thereof may include a hybrid electric vehicle (HEV) or an electric vehicle (EV).

To increase convenience in such eco-friendly vehicles, a vehicle in which a 12V auxiliary battery is added to the existing 12V main battery has been developed for loads (e.g., over the air {OTA}, built-in cam, airbag control unit {ACU}, etc.) in which dual power of a 12V system is required. In the present way, in a system using two 12V batteries, a bidirectional converter is applied between the main battery and the auxiliary battery to prevent mutual charging and discharging due to a voltage difference between the 12V main battery and the auxiliary battery.

However, such a bidirectional converter may cause an increase in the cost of the vehicle and an increase in the vehicle weight.

Accordingly, there is a demand for a voltage/control technology capable of preventing mutual charging and discharging due to the voltage difference between the main battery and the auxiliary battery without the bidirectional converter in the present field of the present disclosure.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a power supply method and apparatus configured for replacing the function of a bidirectional converter through LDC and relay control.

Another aspect of the present disclosure is to provide a power supply method and apparatus configured for managing state of charge (SOC) while preventing mutual charging and discharging due to a voltage difference between a main battery and an auxiliary battery without a bidirectional converter.

The technical subjects pursued in the present disclosure may not be limited to the above-mentioned technical subjects, and other technical subjects which are not mentioned may be clearly understood, through the following descriptions, by those skilled in the art to which the present disclosure pertains.

In accordance with an aspect of the present disclosure, there is provided a power supply apparatus including: a converter configured to convert a voltage of a high-voltage battery to supply power; a first low-voltage battery configured to be charged by receiving power from the converter and to supply power to a general load or a dual power load; a second low-voltage battery configured to be charged by receiving power from the converter and to supply power to the dual power load; a first relay disposed between the converter and the first low-voltage battery; a second relay disposed between the converter and the second low-voltage battery; a first battery sensor configured to measure a voltage of the first low-voltage battery; and a second battery sensor configured to measure a voltage of the second low-voltage battery.

In the instant case, the first relay and the second relay may be opened or closed according to a state of charge (SOC) value of the first low-voltage battery or an SOC value of the second low-voltage battery.

In the instant case, before the first relay is opened, a current value flowing through the first low-voltage battery may be configured to be zero.

In the instant case, before the second relay is opened, a current value flowing through the second low-voltage battery may be configured to be zero.

In the instant case, before the first relay is closed, an output voltage of the converter may be configured to be a same as an output voltage of the first low-voltage battery.

In the instant case, before the second relay is closed, the output voltage of the converter may be configured to be a same as an output voltage of the second low-voltage battery.

In the instant case, when the output voltage of the converter is less than a predetermined threshold value, the dual power load may receive power from the converter and the first low-voltage battery.

In the instant case, when the output voltage of the converter is equal to or greater than the predetermined threshold value, the dual power load may receive power from the converter and the second low-voltage battery.

In the instant case, when the converter is in an OFF state, the dual power load may receive power from the second low-voltage battery.

In the instant case, when the SOC value of the second low-voltage battery is equal to or less than a reference value, the dual power load may receive power from the first low-voltage battery.

In accordance with another aspect of the present disclosure, there is provided a power supply method including: converting, by a converter, a voltage of a high-voltage battery to charge a first low-voltage battery; supplying power to a dual power load from the first low-voltage battery or a second low-voltage battery based on a comparison result between an output voltage of the converter and a predetermined threshold value; opening a first relay between the converter and the first low-voltage battery when a state of charge (SOC) value of the first low-voltage battery is in a normal state; and closing a second relay between the converter and the second low-voltage battery; and charging, by the converter, the second low-voltage battery.

In the instant case, the power supply method may further include, before the opening of the first relay, configuring a current value flowing through the first low-voltage battery to be zero.

In the instant case, the power supply method may further include, before the closing of the second relay, configuring the output voltage of the converter to be a same as an output voltage of the second low-voltage battery.

In the instant case, the power supply method may further include opening the second relay when an SOC value of the second low-voltage battery is in a normal state, and closing the first relay.

In the instant case, the power supply method may further include, before the opening of the second relay, configuring a current value flowing through the second low-voltage battery to be zero.

In the instant case, the power supply method may further include, before the closing of the first relay, configuring the output voltage of the converter to be the same as the output voltage of the first low-voltage battery.

In the instant case, the supplying of the power to the dual power load may include supplying power to the dual power load from the converter and the first low-voltage battery when the output voltage of the converter is less than the predetermined threshold value.

In the instant case, the supplying of the power to the dual power load may include supplying power to the dual power load from the converter and the second low-voltage battery when the output voltage of the converter is equal to or greater than the predetermined threshold value.

In the instant case, the power supply method may further include supplying power to the dual power load from the second low-voltage battery when the converter is in an OFF state.

In the instant case, the power supply method may further include supplying power to the dual power load from the first low-voltage battery when the SOC value of the second low-voltage battery is equal to or less than a reference value.

As described above, according to various embodiments of the present disclosure, it is possible to prevent mutual charging and discharging due to a voltage difference between a main battery and an auxiliary battery without a bidirectional converter.

Furthermore, it is possible to prevent a surge current when a relay is closed.

Furthermore, because a power supply apparatus can operate without a bidirectional converter, it is possible to reduce the cost and weight of a vehicle and to improve fuel efficiency thereof.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
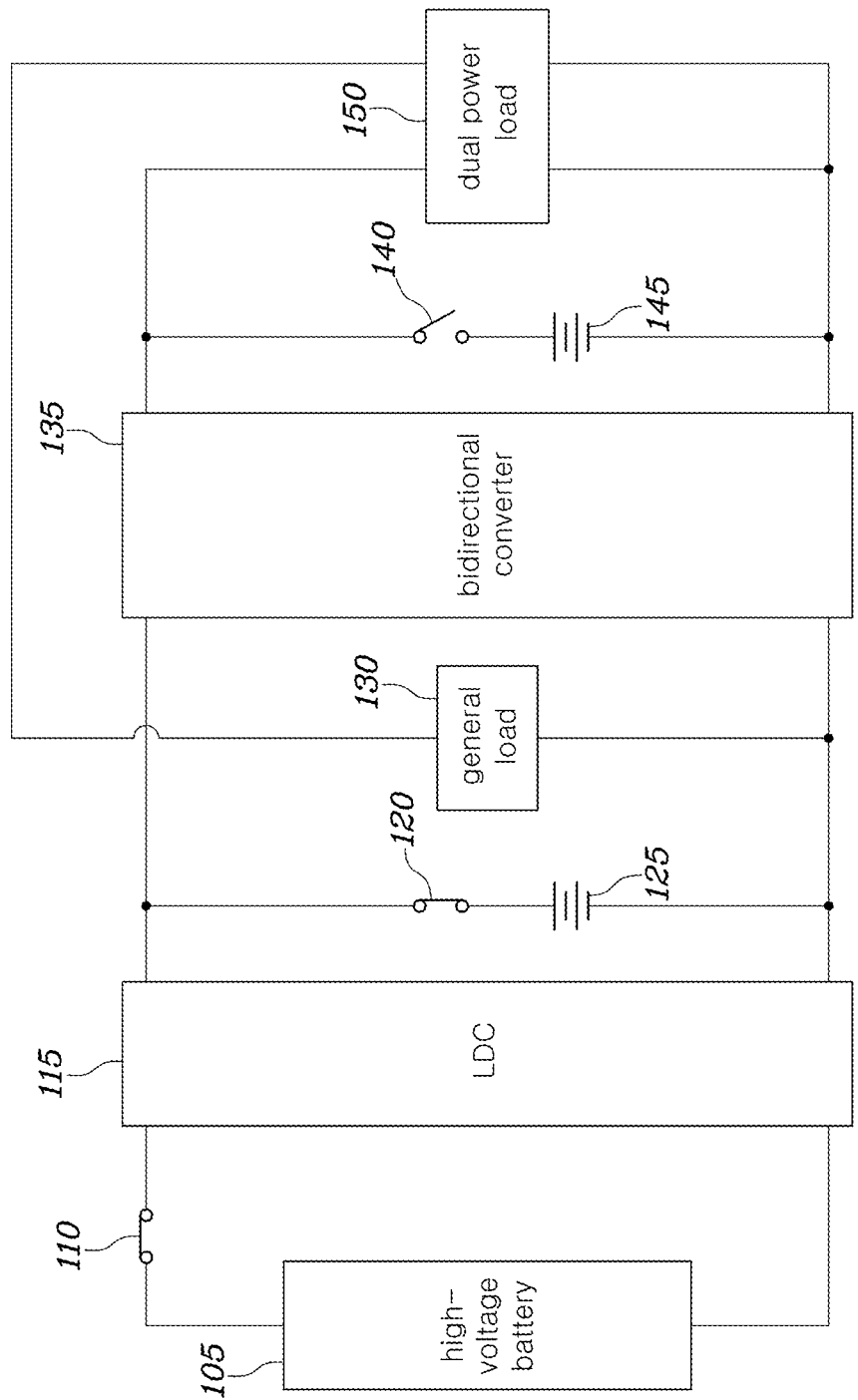
FIG. 1 illustrates a power supply apparatus including a conventional bidirectional converter.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings, and the same or similar elements are provided the same and similar reference numerals, so duplicate descriptions thereof will be omitted. The terms "module" and "unit" used for the elements in the following description are provided or interchangeably used in consideration of only the ease of writing the specification, and do not have distinct meanings or roles by themselves. In describing the exemplary embodiments included in the present specification, when the detailed description of the relevant known technology is determined to unnecessarily obscure the gist of the present disclosure, the detailed description may be omitted. Furthermore, the accompanying drawings are provided only for easy understanding of the exemplary embodiments included in the present specification, and the technical spirit included herein is not limited to the accompanying drawings, and it may be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

In the present specification, dual power means a power supply method that supplies power to a load using two independent power sources to safely supply power, and a dual power load means a load that receives power from two independent power sources.

FIG. 1 illustrates a power supply apparatus including a conventional bidirectional converter.

Referring to FIG. 1, a conventional power supply apparatus includes a high-voltage battery 105, a first relay 110, a low-voltage direct current-direct current converter (LDC) 115, a second relay 120, a first low-voltage battery 125, a general load 130, a bidirectional converter 135, a third relay 140, a second low-voltage battery 145, and a dual power load 150.

Power efficiency is increased by supplying a high voltage higher than 12V, for example, 42V, to chassis and motors that require high power in general vehicles, and low-power devices of electronic components use the existing 12V power system.

Accordingly, the high-voltage battery 105 may be a battery supplying a voltage higher than 12V, for example, 42V, and the first and second low-voltage batteries 125 and 145 may be batteries supplying a voltage of 12V.

The high-voltage battery 105 supplies power to the first and second low-voltage batteries 125 and 145, the general load 130, and the dual power load 150 through the LDC 115.

Furthermore, the general load 130 may be driven by power supplied from the LDC 115 or the first low-voltage battery 125, and the dual power load 150 may be driven by power supplied by the LDC 115 or the second low-voltage battery 145.

At the present time, power supply from the high-voltage battery 105 to the LDC 115 may be controlled by the first relay 110, charging or discharging of the first low-voltage battery 125 may be controlled by the second relay 120, and charging or discharging of the second low-voltage battery 145 may be controlled by the third relay 140.

Meanwhile, the bidirectional converter 135 is disposed between the first low-voltage battery 125 and the second low-voltage battery 145 to prevent charging and discharging between them. Therefore, even if the voltage of either the first low-voltage battery 125 or the second low-voltage battery 145 is low, charging and discharging are not performed between them.

However, because the power supply apparatus including the structure shown in FIG. 1 includes the bidirectional converter 135, the cost of forming the vehicle may increase and the weight of the vehicle may increase. Furthermore, fuel efficiency or power efficiency of the vehicle may decrease.

Hereinafter, an exemplary embodiment of a power supply apparatus and a control method thereof according to an exemplary embodiment of the present disclosure for solving the above problems will be described in detail with reference to the accompanying drawings.

Figure 2:
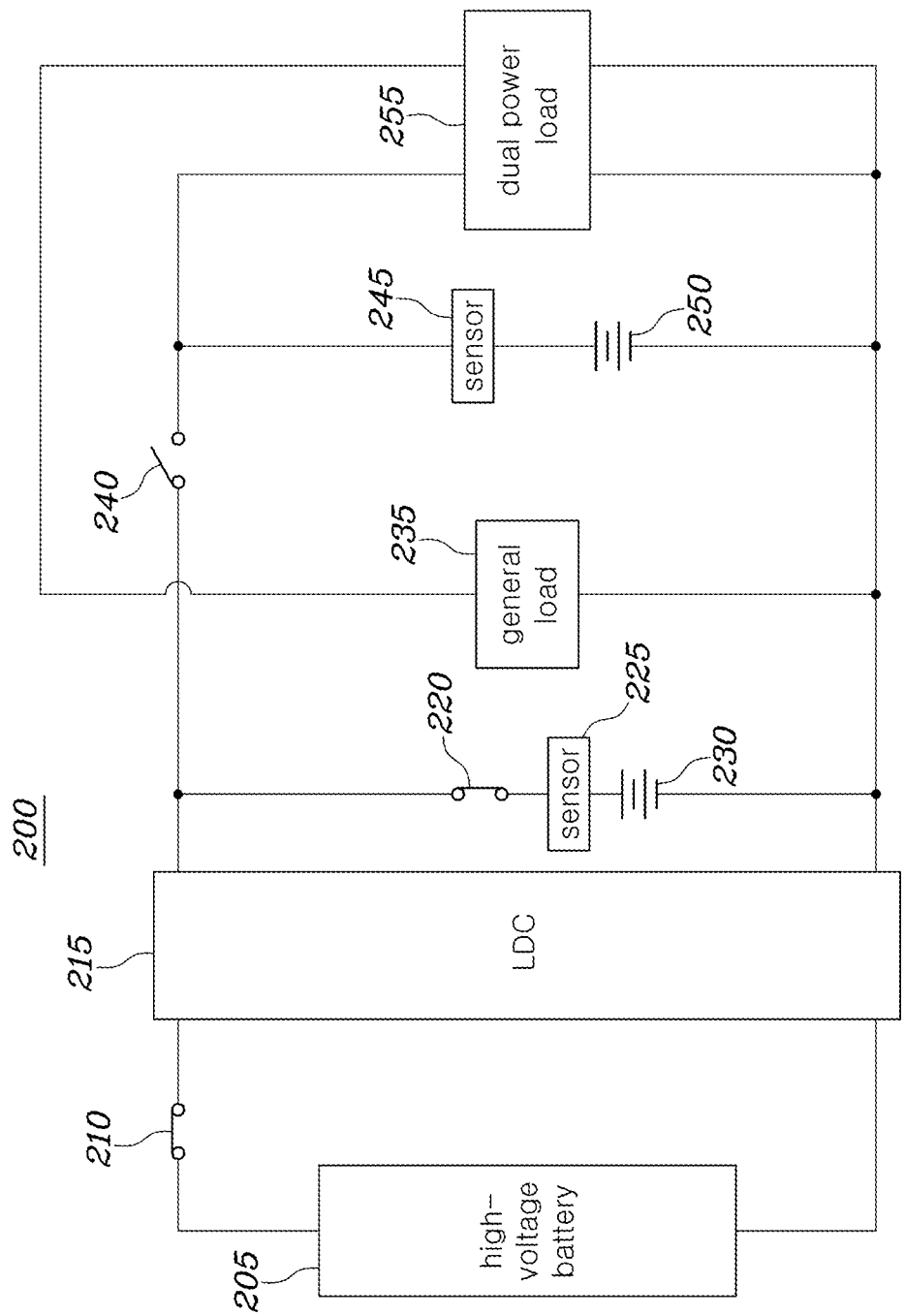
FIG. 2 illustrates a power supply apparatus according to an exemplary embodiment of the present disclosure.

FIG. 2 illustrates a power supply apparatus according to an exemplary embodiment of the present disclosure.

Referring to FIG. 2, the power supply apparatus according to the exemplary embodiment includes a high-voltage battery 205, a first relay 210, a low-voltage direct current-direct current converter (LDC) 215, a second relay 220, a first battery sensor 225, a first low-voltage battery 230, a general load 235, a third relay 240, a second battery sensor 245, a second low-voltage battery 250, and a dual power load 255.

The high-voltage battery 205 charges the first and second low-voltage batteries 230 and 250 through the LDC 215, and supplies power for driving the general load 235 and the dual power load 255.

In the instant case, the power supplied from the high-voltage battery 205 may be power of a battery that supplies power with a voltage higher than 12V, for example, a voltage of 42V.

The first relay 210 is configured to control power supply from the high-voltage battery 205 to the LDC 215.

The LDC 215 converts the voltage of the high-voltage battery 205 to a low voltage to charge the first and second low-voltage batteries 230 and 250 and to supply power for driving the general load 235 and the dual power load 255.

Furthermore, the LDC 215 is configured to control the second and third relays 220 and 240 according to the SOC value of the first and second low-voltage batteries 230 and 250, and is configured to control voltage and current supplied according to the voltage and current of the first and second low-voltage batteries 230 and 250.

The second relay 220 is configured to control charging and discharging of the first low-voltage battery 230 under the control of the LDC 215, and the third relay 240 is configured to control charging and discharging of the second low-voltage battery 250 under the control of the LDC 215.

The first battery sensor 225 measures the voltage, current, and SOC value of the first low-voltage battery 230, and the second battery sensor 245 measures the voltage, current, and SOC value of the second low-voltage battery 250.

The first and second low-voltage batteries 230 and 250 charge power for driving the general load 235 and/or the dual power load 255, or supply power to the general load 235 and/or the dual power load 255.

In the instant case, the output voltage of the first and second low-voltage batteries 230 and 250 may be 12V.

When the LDC 215 or the first low-voltage battery 230 fails to supply power to the dual power load 255, the second low-voltage battery 250 may replace the LDC 215 or the first low-voltage battery 230 to supply power. Accordingly, in an exemplary embodiment of the present disclosure, the first low-voltage battery 230 may be defined as a main battery, and the second low-voltage battery 250 may be defined as an auxiliary battery.

The general load 235 operates by receiving power from the LDC 215 when the LDC 215 is in an ON state, and operates by receiving power from the first low-voltage battery 230 when the LDC 215 is in an OFF state.

At the present time, among the low-voltage batteries 230 and 250, the first low-voltage battery 230 may operate as a main battery that preferentially supplies power to the general load 235 and the dual power load 255 while the vehicle is started and stops the power supply when the vehicle is turned off.

Meanwhile, the second low-voltage battery 250 may operate as an auxiliary battery configured for supplying power to some components when the charged power remains at a predetermined level or more even when the vehicle is turned off.

In the instant case, the general load 235 is configured to operate by receiving power from the LDC 215 or first low-voltage battery 230 to which power supply is stopped when the vehicle is turned off, so that the operation of the general load 235 may be stopped when the vehicle is turned off.

Meanwhile, the dual power load 255, which requires power supply even when the vehicle is turned off among the electronic components, may be configured to operate by receiving power from the LDC 215 and the first or second low-power battery 230 or 250, so that the dual power load 255 may receive power from the second low-voltage battery 250 to maintain its operation while the power of the second low-power battery 250 remains at a certain level or more even when the vehicle is turned off.

The dual power load 255 operates by receiving power from the LDC 215 when the LDC 215 is in an ON state, and operates by receiving power from the first or second low-voltage battery 230 or 250 when the LDC 215 is in an OFF state.

Figure 3:
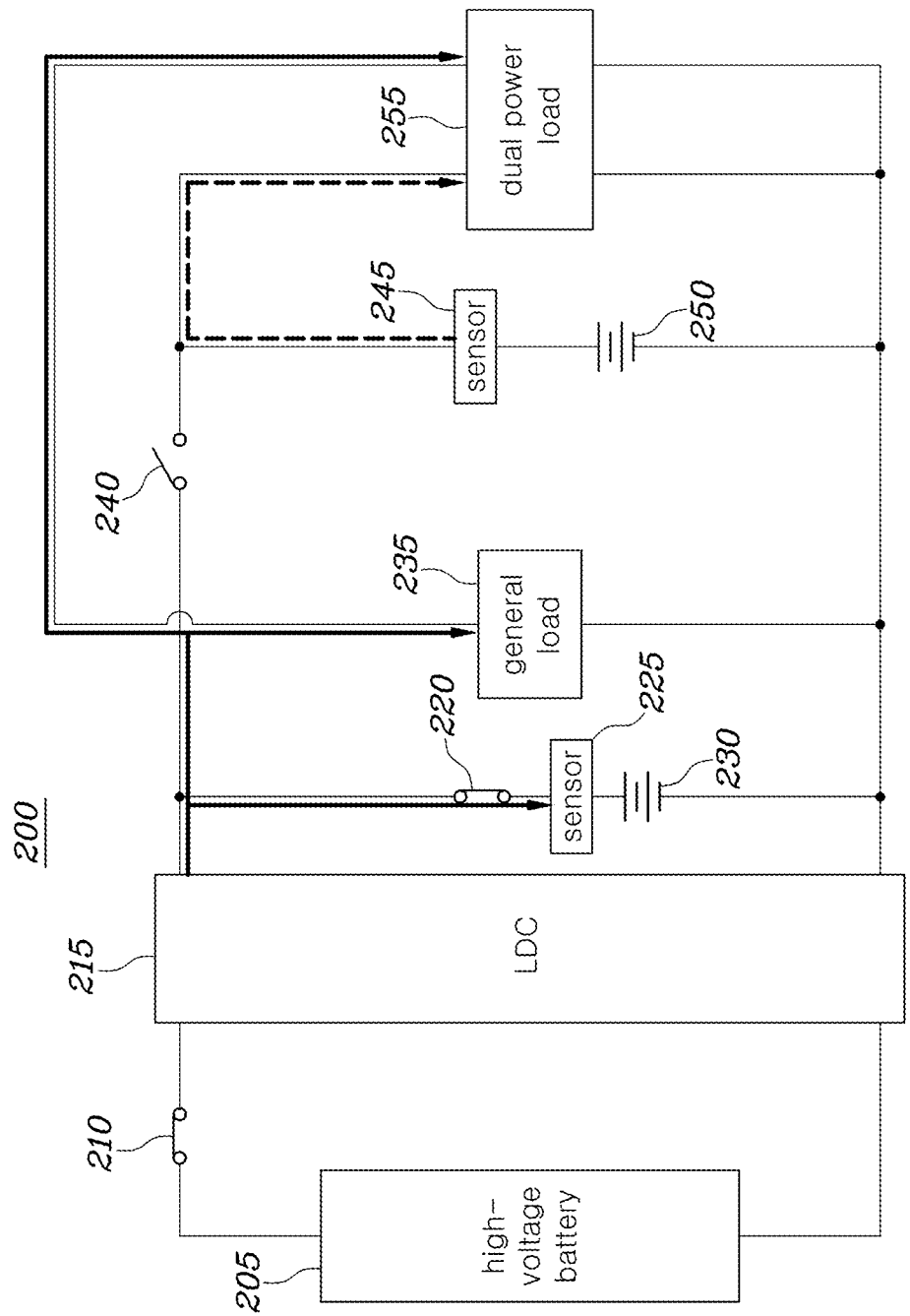
FIG. 3 and FIG. 4 are diagrams illustrating an operating principle of a power supply apparatus according to an exemplary embodiment of the present disclosure.
Figure 4:
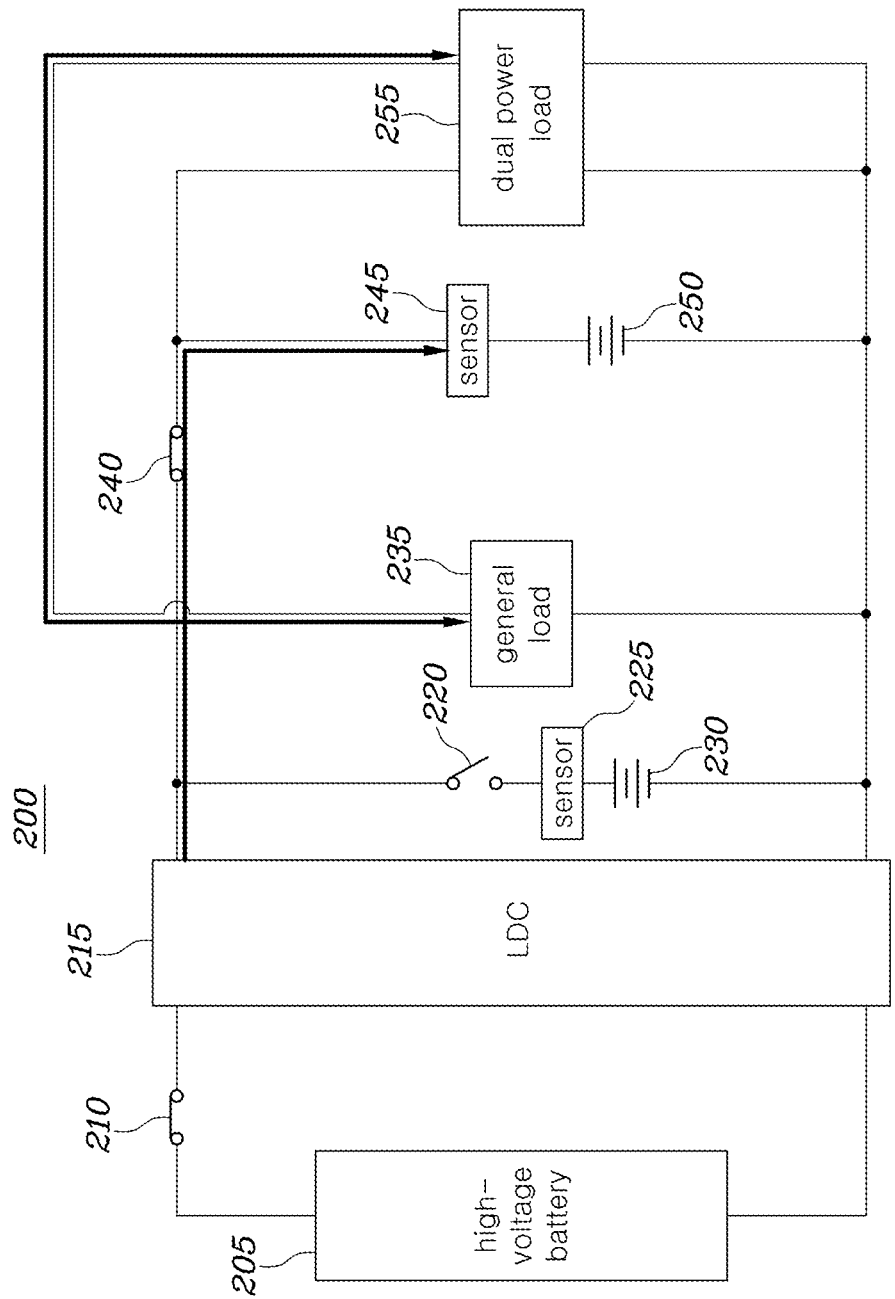

FIG. 3 and FIG. 4 are diagrams illustrating an operating principle of a power supply apparatus according to an exemplary embodiment of the present disclosure.

FIG. 3 illustrates an operating principle of an initial state of a power supply apparatus according to an exemplary embodiment of the present disclosure.

Referring to FIG. 3, in the initial state of the power supply apparatus, the second relay 220 is closed and the third relay 240 is opened. Accordingly, the power of the LDC 215 may be supplied to the first low-voltage battery 230, the general load 235, and the dual power load 255 as illustrated in FIG. 3, and the first low-voltage battery 230 may be charged in real time.

The dual power load 255 may receive power from the first or second low-voltage battery 230 and 250 together with the LDC 215.

In the instant case, the dual power load 255 may receive power from the first low-voltage battery 230 when the output of the LDC 215 is less than the rating, and may receive power from the second low-voltage battery 250 when the output of the LDC 215 is greater than or equal to the rating.

In the instant case, whether the output of the LDC 215 is less than the rating may be determined by comparing the output voltage of the LDC 215 with a predetermined threshold voltage. Here, the output of the LDC 215 may be determined to be less than the rating when the output voltage of the LDC 215 is less than a threshold voltage, and may be determined to be greater than or equal to the rating when the output voltage of the LDC 215 is greater than or equal to the threshold voltage.

In the instant case, the LDC 215 may configure the dual power load 255 to a first mode when the output of the LDC 215 is less than the rating, and may configure the dual power load 255 to a second mode when the output of the LDC 215 is greater than or equal to the rating.

In the instant case, because the dual power load 255 includes a relay therein, the internal relay may be turned ON or OFF so that the dual power load 255 receives only the power transmitted from the first low-voltage battery 230 when the dual power load 255 is configured to the first mode and receives only the power transmitted from the second low-voltage battery 250 when the dual power load 255 is configured to the second mode.

Meanwhile, when the SOC value of the first low-voltage battery 230 is within a normal range, to prevent relay fusion, the LDC 215 is configured to control the current of the first low-voltage battery 230 to be 0(A), and opens the second relay 220.

In the instant case, the SOC value of the first low-voltage battery 230 may be measured by the first battery sensor 225 and transmitted to the LDC 215 in real time.

In the instant case, whether the SOC value of the first low-voltage battery 230 is within the normal range may be determined based on whether the remaining charge amount of the first low-voltage battery 230 is equal to or greater than a predetermined threshold. For example, the LDC 215 may determine that the SOC value of the first low-voltage battery 230 is within the normal range when the remaining charge amount of the first low-voltage battery 230 is 95% or more.

In the instant case, to prevent a surge current due to the close of the third relay 24, the LDC 215 changes the output voltage to the voltage of the second low-voltage battery 250 received from the second battery sensor 245.

Meanwhile, when a difference between the output voltage of the LDC 215 and the voltage of the second low-voltage battery 250 is less than a predetermined threshold value, the LDC 215 closes the third relay 240. Accordingly, the power of the LDC 215 is supplied to the general load 235, the second low-voltage battery 250, and the dual power load 255 as shown in FIG. 4, and the second low-voltage battery 250 may be charged in real time.

On the other hand, when the second low-voltage battery 250 is charged so that the SOC value of the second low-voltage battery 250 is greater than or equal to a target value, the LDC 215 is configured to control the current of the second low-voltage battery 250 to be 0(A) to prevent relay fusion, and opens the third relay 240 to charge the first low-voltage battery 230.

In the instant case, the SOC value of the second low-voltage battery 250 may be measured by the second battery sensor 245 and transmitted to the LDC 215 in real time.

In the instant case, whether the SOC value of the second low-voltage battery 250 is greater than or equal to the target value may be determined based on whether the remaining charge amount of the second low-voltage battery 250 is equal to or greater than a predetermined threshold range. For example, the LDC 215 may determine that the SOC value of the second low-voltage battery 250 is equal to or greater than the target value when the remaining charge amount of the second low-voltage battery 250 is 95% or more.

In the instant case, when a difference between the output voltage of the LDC 215 and the voltage of the first low-voltage battery 230 is less than a predetermined threshold value, the LDC 215 closes the second relay 230.

Thereafter, the LDC 215 may control charging and discharging of the first low-voltage battery 230 according to the state of the first low-voltage battery 230 and the vehicle.

Meanwhile, in an exemplary embodiment of the present disclosure, it has been described that the control of the second and third relays 220 and 240 and the first and second low-voltage batteries 230 and 250 is performed by the LDC 215, but the power supply apparatus may further include a separate controller, and the control of the second and third relays 220 and 240 and the first and second low-voltage batteries 230 and 250 may be performed by the controller.

Furthermore, the LDC according to the exemplary embodiment may be provided in a form in which a controller is integrated into a converter for converting a voltage.

Figure 5:
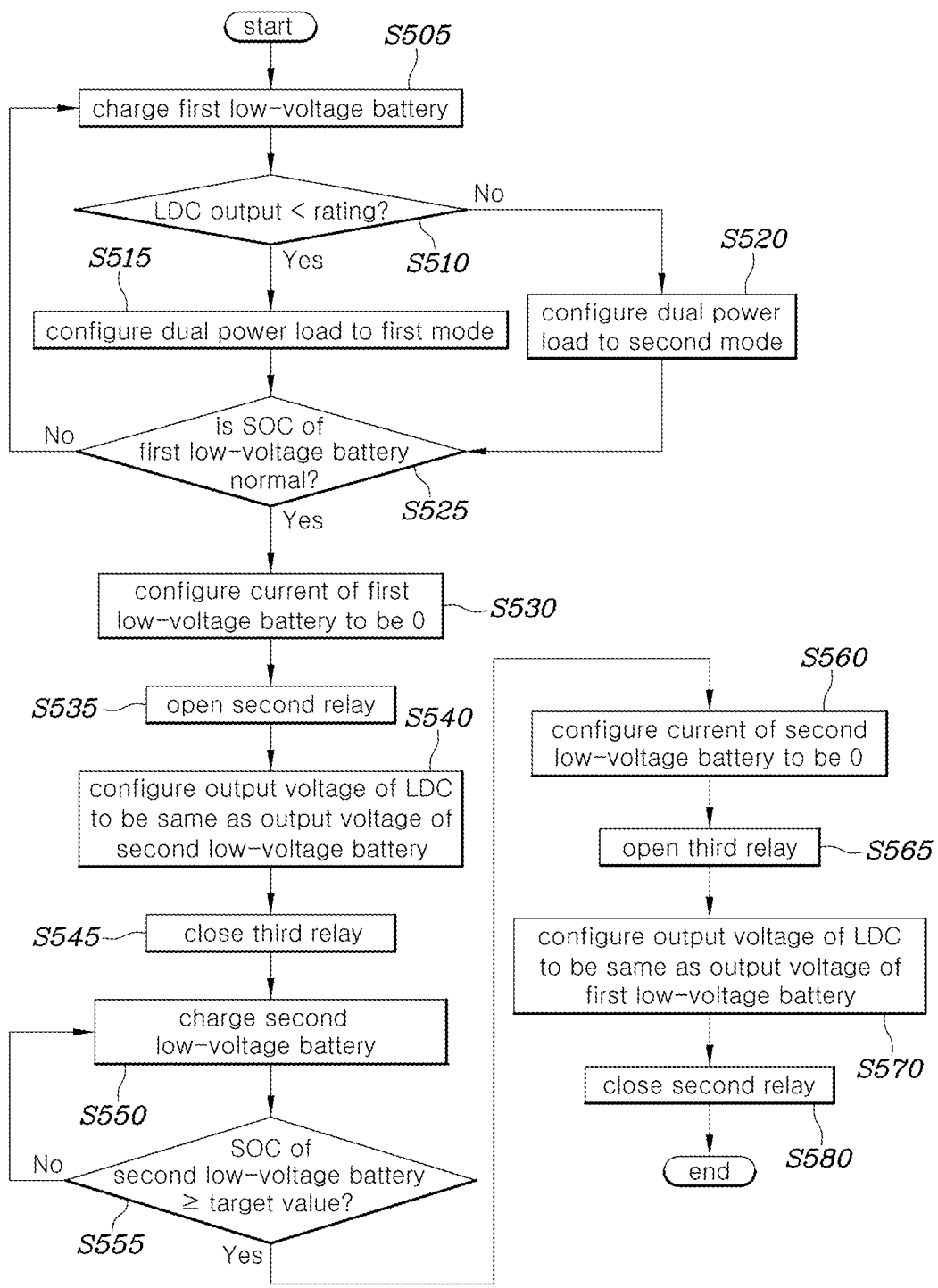
FIG. 5 is a flowchart illustrating a power supply method of a power supply apparatus according to an exemplary embodiment of the present disclosure.

FIG. 5 is a flowchart illustrating a power supply method of a power supply apparatus according to an exemplary embodiment of the present disclosure. Each operation of FIG. 5 may be performed by the LDC of the power supply apparatus of FIG. 2.

Referring to FIG. 5 together with FIG. 2, in operation S505, the LDC 215 charges the first low-voltage battery 230.

In the instant case, the LDC 215 may supply charging power to the first low-voltage battery 230 by closing the second relay 220 and opening the third relay 240.

Furthermore, in operation S510, the LDC 215 determines whether the output of the LDC 215 is less than the rating.

In the instant case, whether the output of the LDC 215 is less than the rating may be determined by comparing the output voltage of the LDC 215 with a predetermined threshold voltage. When the output voltage of the LDC 215 is less than the threshold voltage, it may be determined that the output of the LDC 214 is less than the rating, and when the output voltage thereof is equal to or greater than the threshold voltage, it may be determined that the output thereof is greater than or equal to the rating.

As a result of the determination in operation S510, the LDC 215 configures a power supply mode of the dual power load 255 to a first mode in operation S515 when the output of the LDC 215 is less than the rating, and configures the power supply mode of the dual power load 255 to a second mode in operation S520 when the output of the LDC 215 is equal to or greater than the rating.

In the instant case, because the dual power load 255 includes a relay therein, the internal relay may be turned ON/OFF so that only the power transmitted from the first low-voltage battery 230 among the first and second low-voltage batteries 230 and 250 is received when the dual power load 255 is configured to the first mode, and only the power transmitted from the second low-voltage battery 250 is received when the dual power load 255 is configured to the second mode.

In the instant case, because the dual power load 255 includes the internal relay, the internal relay may be turned ON/OFF so that only the power transmitted from the first low-voltage battery 230 is received when the dual power load 255 is configured to the first mode, and only the power transmitted from the second low-voltage battery 250 is received when the dual power load 255 is configured to the second mode.

Furthermore, in operation S525, the LDC 215 determines whether the SOC value of the first low-voltage battery 230 is in a normal state.

In the instant case, the SOC value of the first low-voltage battery 230 may be measured by the first battery sensor 225 and transmitted to the LDC 215 in real time.

In the instant case, whether the SOC value of the first low-voltage battery 230 is in the normal state may be determined based on whether the remaining charge amount of the first low-voltage battery 230 is equal to or greater than a predetermined threshold range. For example, the LDC 215 may determine that the SOC value of the first low-voltage battery 230 is in the normal state when the remaining charge amount of the first low-voltage battery 230 is 95% or more.

As a result of the determination in operation S525, when it is determined that the SOC value of the first low-voltage battery 230 is in the normal state, the LDC 215 configures a current flowing through the first low-voltage battery 230 to be 0(A) in operation S530, and opens the second relay 220 in operation S535.

In the instant case, controlling the current of the first low-voltage battery 230 to be 0 in operation S530 is to prevent relay fusion.

Meanwhile, when it is determined that the SOC value of the first low-voltage battery 230 is not in the normal state as a result of the determination in operation S525, the LDC 220 continues to charge the first low-voltage battery in operation S505.

After operation S535, in operation S540, the LDC 215 configures the output voltage of the LDC 215 to be the same as the output voltage of the second low-voltage battery 250. In the instant case, the reason for configuring the output voltage of the LDC 215 to be the same as the output voltage of the second low-voltage battery 250 in operation S540 is to prevent a surge current and relay fusion.

In the instant case, to configure the output voltage of the LDC 215 to be the same voltage as the output voltage of the second low-voltage battery 250, the output voltage of the second low-voltage battery 250 may be measured by the second battery sensor 245 and transmitted to the LDC 215.

Furthermore, the LDC 215 closes the third relay 240 in operation S545 and charges the second low-voltage battery 250 in operation S550.

Meanwhile, in operation S555, the LDC 215 determines whether the second low-voltage battery 250 is charged so that the SOC value of the second low-voltage battery 250 is equal to or greater than a target value.

In the instant case, the SOC value of the second low-voltage battery 250 may be measured by the second battery sensor 245 and transmitted to the LDC 215 in real time.

In the instant case, whether the second low-voltage battery 250 is charged so that the SOC value of the second low-voltage battery 250 is equal to or greater than the target value may be determined based on whether the remaining charge amount of the second low-voltage battery 250 is greater than or equal to a predetermined threshold range. For example, the LDC 215 may determine that the SOC value of the second low-voltage battery 250 is equal to or greater than the target value when the remaining charge amount of the second low-voltage battery 250 is 95% or more.

As a result of the determination in operation S555, when the second low-voltage battery 250 is charged so that the SOC thereof is equal to or greater than the target value, the LDC 215 configures the current flowing through the second low-voltage battery 250 to be 0(A) in operation S560, and opens the third relay 240 in operation S565.

In the instant case, the reason for controlling the current of the second low-voltage battery 250 to be 0 in operation S560 is to prevent relay fusion.

As a result of the determination in operation S555, when the SOC value of the second low-voltage battery 250 is less than the target value, the LDC 215 continues to charge the second low-voltage battery 250 in operation S550.

After operation S565, the LDC 215 configures the output voltage of the LDC 215 to be the same as the output voltage of the first low-voltage battery 230 in operation S570. At the instant time, the reason for configuring the output voltage of the LDC 215 to be the same as the output voltage of the first low-voltage battery 230 in operation S570 is to prevent a surge current and relay fusion.

In the instant case, to configure the output voltage of the LDC 215 to be the same voltage as the output voltage of the first low-voltage battery 230, the output voltage of the first low-voltage battery 230 may be measured by the first battery sensor 220 and transmitted to the LDC 215.

Furthermore, the LDC 215 closes the third relay 240 in operation S575, and is configured to control charging and discharging of the first low-voltage battery 230 in operation S580.

In the instant case, the LDC 215 may control charging and discharging of the first low-voltage battery 230 according to the state of the first low-voltage battery 230 and the vehicle.

Figure 6:
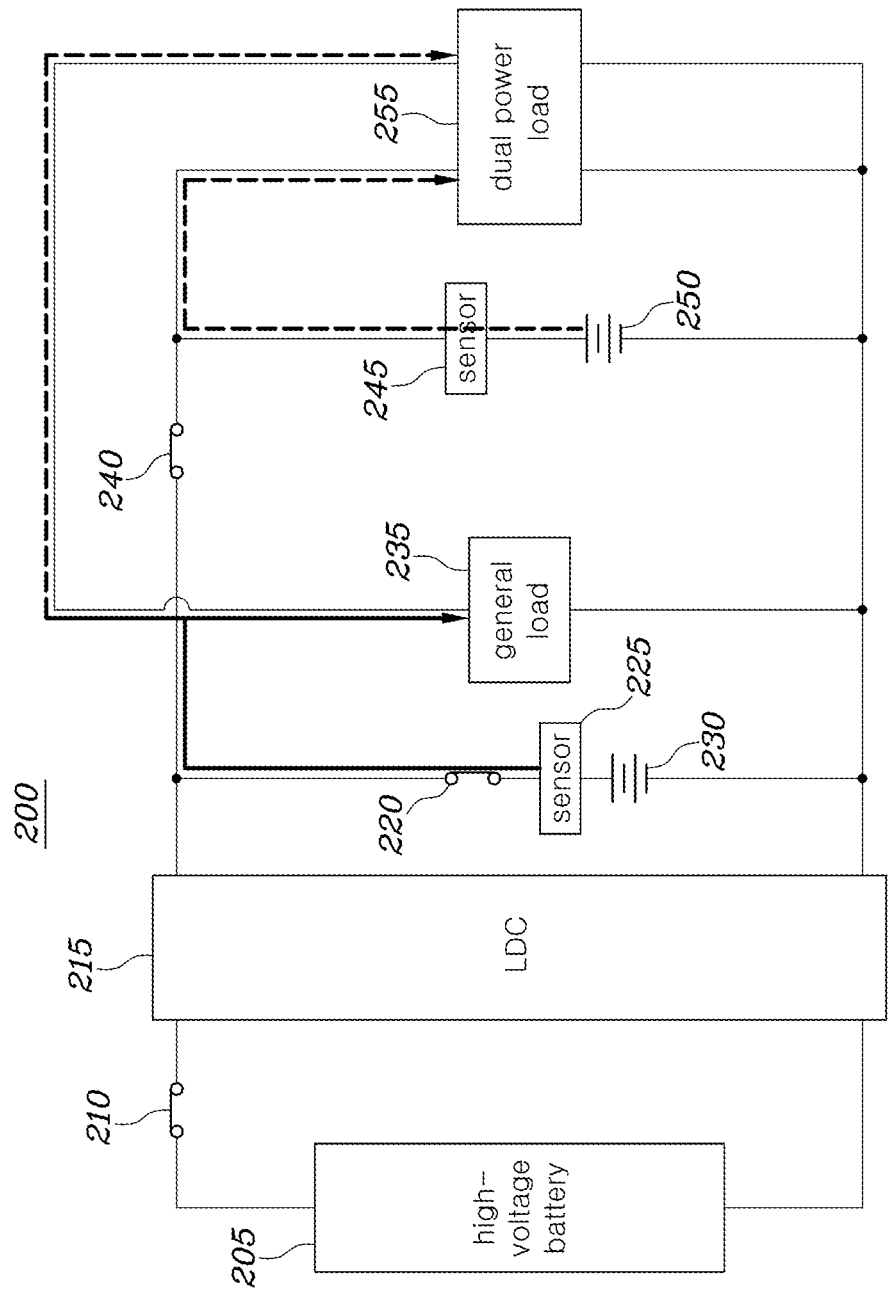
FIG. 6 is a diagram illustrating an operating principle of a power supply apparatus according to another exemplary embodiment of the present disclosure.

FIG. 6 is a diagram illustrating an operating principle of a power supply apparatus for dual power load according to another exemplary embodiment of the present disclosure.

Referring to FIG. 6, when the power of the LDC 215 is turned OFF, the LDC 215 closes the second relay 220, and converts the LDC 215 to be in an OFF state while the third relay 240 is opened.

Meanwhile, when the LDC 215 is in the OFF state, the vehicle may be in a parked or standby state.

In the instant case, the second relay 220 is closed and the third relay 240 is open, so that the general load 235 can operate by receiving power from the first low-voltage battery 230.

Figure 7:
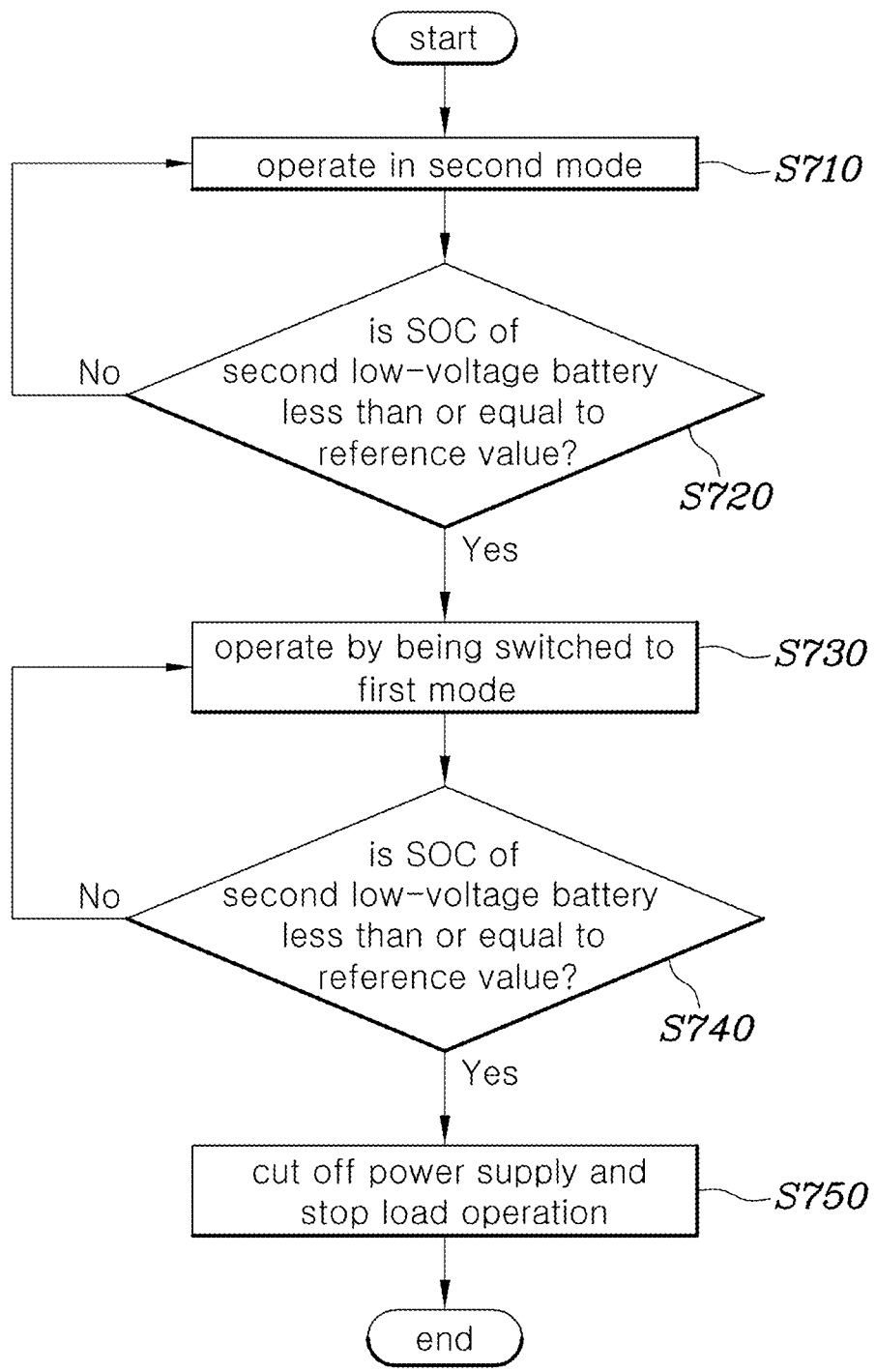
FIG. 7 is a flowchart illustrating a power supply method of a power supply apparatus according to another exemplary embodiment of the present disclosure.

FIG. 7 is a flowchart illustrating a power supply method of a power supply apparatus according to another exemplary embodiment of the present disclosure. The power supply method according to the exemplary embodiment of the present disclosure represents a method of supplying power to the dual power load 255 when the LDC 215 is in an OFF state. Furthermore, the power supply method according to the exemplary embodiment may be performed by the dual power load 255.

The power supply method according to the exemplary embodiment may be performed when the LDC 215 is switched to an OFF state and the vehicle enters a parking or standby state. Accordingly, the exemplary embodiment of the present disclosure may be performed in a state in which the second relay 220 is closed and the third relay 240 is open as shown in FIG. 6.

Referring to FIG. 7, in operation S710, the dual power load 255 operates by receiving power in a second mode receiving power from the second low-voltage battery 250.

At the present time, because the dual power load 255 includes a relay therein, the internal relay may be turned ON or OFF so that the dual power load 255 receives only the power transmitted from the first low-voltage battery 230 when the dual power load 255 is configured to the first mode and receives only the power transmitted from the second low-voltage battery 250 when the dual power load 255 is configured to the second mode.

Furthermore, in operation S720, the dual power load 255 determines whether the SOC value of the second low-voltage battery 250 is less than or equal to a reference value.

In the instant case, the dual power load 255 may receive the remaining charge amount of the second low-voltage battery 250 from the second battery sensor 245 in real time, and may determine whether the SOC value of the second low-voltage battery 250 is equal to or less than the reference value based on whether the remaining charge amount of the second low-voltage battery 250 is less than or equal to a predetermined first threshold value.

For example, the dual power load 255 may determine that the SOC value of the second low-voltage battery 250 is equal to or less than the reference value when the remaining charge amount of the second low-voltage battery 250 is 50% or less.

As a result of the determination in operation S720, when the SOC value of the second low-voltage battery 250 is less than or equal to the reference value, the dual power load 255 is switched to the first mode in which power is supplied from the first low-voltage battery 230, to operate by receiving power in operation S730.

Furthermore, in operation S740, the dual power load 255 determines whether the SOC value of the first low-voltage battery 250 is less than or equal to a reference value.

At the present time, the dual power load 255 may receive the remaining charge amount of the first low-voltage battery 230 from the first battery sensor 225 in real time, and may determine whether the SOC value of the first low-voltage battery 250 is equal to or less than the reference value based on whether the remaining charge amount of the first low-voltage battery 230 is less than or equal to a predetermined second threshold value.

In the instant case, the second threshold value may be configured to be the same as or different from the first threshold value.

As a result of the determination in operation S740, when the SOC value of the first low-voltage battery 230 is less than or equal to the reference value, the dual power load 255 cuts off the power supply from the first low-voltage battery 230 and stops a load operation in operation S750.

As described above, according to the exemplary embodiments of the present disclosure, it is possible to prevent mutual charging and discharging due to a voltage difference between a main battery and an auxiliary battery without a bidirectional converter.

Furthermore, it is possible to prevent a surge current when the relay is closed.

Furthermore, because a power supply apparatus can operate without a bidirectional converter, it is possible to reduce the cost and weight of a vehicle and to improve fuel efficiency thereof.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A power supply apparatus comprising:
   a low voltage direct current-direct current converter (LDC) configured to convert a voltage of a high-voltage battery to supply power;
   a first low-voltage battery configured to be charged by receiving the power from the LDC and to supply power to a predetermined load or a dual power load;
   a second low-voltage battery configured to be charged by receiving the power from the LDC and to supply power to the dual power load;
   a first relay disposed between the LDC and the first low-voltage battery;
   a second relay disposed between the LDC and the second low-voltage battery;
   a first battery sensor configured to measure a voltage of the first low-voltage battery; and
   a second battery sensor configured to measure a voltage of the second low-voltage battery.

2. The power supply apparatus of claim 1, wherein the first relay and the second relay are configured to be opened or closed according to a state of charge (SOC) value of the first low-voltage battery or an SOC value of the second low-voltage battery.

3. The power supply apparatus of claim 1, wherein, before the first relay is opened, a current value flowing through the first low-voltage battery is configured to be zero.

4. The power supply apparatus of claim 1, wherein, before the second relay is opened, a current value flowing through the second low-voltage battery is configured to be zero.

5. The power supply apparatus of claim 1, wherein, before the first relay is closed, an output voltage of the LDC is configured to be a same as the voltage of the first low-voltage battery.

6. The power supply apparatus of claim 1, wherein, before the second relay is closed, an output voltage of the LDC is configured to be a same as the voltage of the second low-voltage battery.

7. The power supply apparatus of claim 1, wherein, when an output voltage of the LDC is less than a predetermined threshold value, the dual power load receives power from the LDC and the first low-voltage battery.

8. The power supply apparatus of claim 1, wherein, when an output voltage of the LDC is equal to or greater than a predetermined threshold value, the dual power load receives power from the LDC and the second low-voltage battery.

9. The power supply apparatus of claim 1, wherein, when the LDC is in an OFF state, the dual power load receives power from the second low-voltage battery.

10. The power supply apparatus of claim 9, wherein, when a state of charge (SOC) value of the second low-voltage battery is equal to or less than a reference value, the dual power load receives power from the first low-voltage battery.

11. A power supply method comprising:
    converting, by a low voltage direct current-direct current converter (LDC), a voltage of a high-voltage battery to charge a first low-voltage battery;
    supplying power to a dual power load from the first low-voltage battery or a second low-voltage battery based on a result of comparing between an output voltage of the LDC and a predetermined threshold value;
    opening a first relay connected between the LDC and the first low-voltage battery when a state of charge (SOC) value of the first low-voltage battery is in a normal state;
    closing a second relay connected between the LDC and the second low-voltage battery; and
    charging, by the LDC, the second low-voltage battery.

12. The power supply method of claim 11, further including:
    before the opening of the first relay, configuring a current value flowing through the first low-voltage battery to be zero.

13. The power supply method of claim 11, further including:
    before the closing of the second relay, configuring the output voltage of the LDC to be a same as an voltage of the second low-voltage battery.

14. The power supply method of claim 11, further including:
opening the second relay when an SOC value of the second low-voltage battery is in a normal state; and
closing the first relay.

15. The power supply method of claim 14, further including:
before the opening of the second relay, configuring a current value flowing through the second low-voltage battery to be zero.

16. The power supply method of claim 14, further including:
before the closing of the first relay, configuring the output voltage of the LDC to be a same as an output voltage of the first low-voltage battery.

17. The power supply method of claim 11, wherein the supplying of the power to the dual power load includes supplying power to the dual power load from the LDC and the first low-voltage battery when the output voltage of the LDC is less than the predetermined threshold value.

18. The power supply method of claim 11, wherein the supplying of the power to the dual power load includes supplying power to the dual power load from the LDC and the second low-voltage battery when the output voltage of the LDC is equal to or greater than the predetermined threshold value.

19. The power supply method of claim 11, further including:
supplying power to the dual power load from the second low-voltage battery when the LDC is in an OFF state.

20. The power supply method of claim 19, further including:
supplying power to the dual power load from the first low-voltage battery when an SOC value of the second low-voltage battery is equal to or less than a reference value.

* * * * *